United States Patent
Colting

(10) Patent No.: US 8,245,966 B2
(45) Date of Patent: Aug. 21, 2012

(54) AIRSHIP AND VECTORED PROPELLER DRIVE THEREFOR

(75) Inventor: Hokan S. Colting, Newmarket (CA)

(73) Assignee: 21st Century Airship Technologies Inc., Newmarket, Ontario ( * ) Notice: Subject to any disclaimer, the term of this patent is extended or adjusted under 35 U.S.C. 154(b) by 290 days.

(21) Appl. No.: 12/700,467

(22) Filed: Feb. 4, 2010

(65) Prior Publication Data

US 2010/0224722 A1    Sep. 9, 2010

Related U.S. Application Data

(60) Provisional application No. 61/149,797, filed on Feb. 4, 2009.

(51) Int. Cl.
    *B64D 29/00* (2006.01)
(52) U.S. Cl. ............... 244/56; 244/66; 244/26; 244/30
(58) Field of Classification Search ............... 244/24, 244/26, 30, 36, 12.4, 56, 66
    See application file for complete search history.

(56) References Cited

U.S. PATENT DOCUMENTS

| | | |
|---|---|---|
| 1,291,687 A | 1/1919 | Reynolds et al. |
| 1,457,024 A | 5/1923 | Franzen |
| 1,869,256 A | 7/1932 | Hines |
| 3,288,397 A | 11/1966 | Fitzpatrick |
| 3,899,992 A | 8/1975 | Fuller |
| 4,102,499 A | 7/1978 | Hall |
| 4,204,656 A | 5/1980 | Seward, III |
| 2,131,155 A | 9/1983 | Waller |
| 4,402,475 A | 9/1983 | Pavlecka |
| 4,591,112 A | 5/1986 | Piasecki et al. |
| 4,905,932 A | 3/1990 | Piasecki |
| 5,131,603 A | 7/1992 | Meyers |
| 5,205,512 A | 4/1993 | Rumberger |
| 5,277,381 A | 1/1994 | Piasecki |
| 5,368,256 A | 11/1994 | Kalisz et al. |
| 5,383,627 A | 1/1995 | Bundo |
| 5,906,335 A | 5/1999 | Thompson |
| 6,467,724 B2 | 10/2002 | Kuenkler |
| 6,915,983 B2 * | 7/2005 | Thomassey et al. ....... 244/17.25 |
| 7,055,777 B2 | 6/2006 | Colting |
| 2002/0130220 A1 * | 9/2002 | Sparks et al. ................ 244/128 |
| 2005/0173591 A1 | 8/2005 | Colting |
| 2005/0258305 A1 | 11/2005 | Piers et al. |
| 2008/0179452 A1 * | 7/2008 | Kinkopf et al. ................ 244/24 |

* cited by examiner

*Primary Examiner* — Tien Dinh
*Assistant Examiner* — Jamie S Stehle
(74) *Attorney, Agent, or Firm* — Symbus Law Group, LLC; Clifford D. Hyra

(57) ABSTRACT

A propulsion unit for an airship comprises a driveshaft, having a gimbal mount to a mounting frame attachable to a fuselage, the gimbal being mounted in the mounting frame and comprising an inner ring and an outer ring having orthogonal rotational axes, the inner ring including a propeller unit having a conical housing pivotable on trunnions with the gimbal and a propeller affixed to a propeller shaft coaxial with the axis of the conical housing. The outer ring includes a toroidal Orientation of the conical housing and propeller shaft is accomplished by actuators, a first actuator controlling the angle of the outer ring relative to the framework and a second actuator controlling the angle of the conical housing relative to the outer ring.

9 Claims, 3 Drawing Sheets

Fig. 1
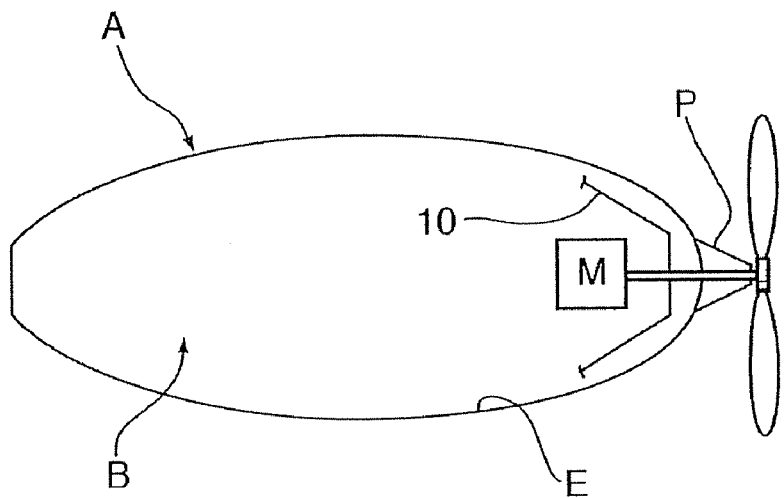
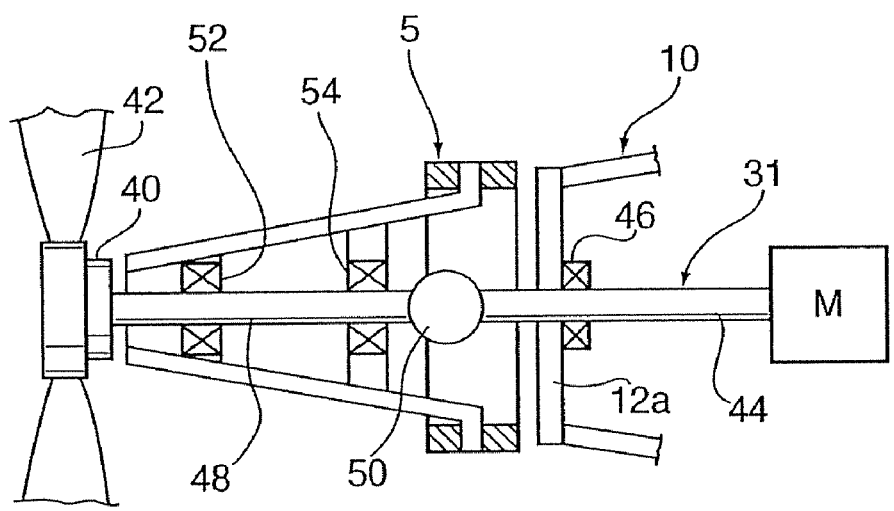
Fig. 4

AIRSHIP AND VECTORED PROPELLER DRIVE THEREFOR

CROSS REFERENCE TO RELATED APPLICATIONS

This application claims priority from U.S. Application No. 61/149,797 filed on Feb. 4, 2009, the contents of which are incorporated herein by reference.

BACKGROUND OF THE INVENTION

The present invention relates generally to a direction control and propulsion system for an airship.

Airships are capable of low airspeeds right down to motionless hovering, and at such speeds must depend upon means other than rudders, ailerons and similar air-deflecting panels to control their direction and attitude in flight and hovering. One conventional method of gaining such control has been by using a propulsion unit having a propeller and propulsion motor mounted on a movable platform, the angle of the combination being variable in pitch and yaw. This can become heavy and cumbersome where a large motor is needed for high power. Another method has been to mount motor-propeller units on vertical shafts under the airship and to rotate the units on the vertical shafts. Other methods include the use of ducted propellers with deflectors to change the angle of thrust, and ducting within the gas envelope to direct thrust to outlets placed at desired locations on the surface of the envelope. Various drawbacks to these apparatuses and methods include high cost, low efficiency and potentially high maintenance efforts.

It is an object of the present invention to obviate or mitigate the above disadvantages.

SUMMARY OF THE INVENTION

The present invention addresses such issues by providing a direction control and propulsion system for an aerostatic lift body with a fuselage. The propulsion unit comprises a driveshaft, having a gimbal assembly mounted to a framework attachable to a fuselage, the gimbal comprising an inner ring and an outer ring having orthogonal rotational axes. A propeller unit is secured to one of said rings and has a propeller and a propeller shaft extending through the gimbal assembly. Orientation of the propeller unit is accomplished by actuators. A first actuator acts between the one ring and the other ring to vary their relative inclination and a second actuator is mounted between the framework and the other ring to vary its inclination relative to the framework. The drive shaft includes two portions connected by a constant velocity joint positioned on the axis of rotation of the gimbal. One portion of the drive shaft is supported in the framework for transfer of power from a prime mover and the other portion is secured to the propeller for inducing its rotation In another aspect, the invention provides an airship having an aerostatic lift body with a fuselage having at least one propulsion unit mounted thereon, the propulsion unit comprising an external driveshaft, gimbal mounted to the fuselage of the airship comprising an inner ring and an outer ring having orthogonal rotational axes, and a propeller unit comprising a conical housing pivotable on trunnions with the gimbal and a propeller affixed to a propeller shaft coaxial with the axis of the cone. Orientation of the conical housing and propeller shaft is accomplished by actuators, a first actuator being mounted between the framework and the outer ring, controlling the inclination of the outer ring relative to the framework and a second actuator being mounted between the outer ring and the conical housing, controlling the inclination of the conical housing relative to the outer ring. Preferably the airship has two propulsion units mounted fore and aft of the fuselage, although a single unit at one end of the airship enhances the manoeuvrability of the airship.

The propulsion unit can be mounted on the airship in any suitable manner. If the envelope of the airship has an internal frame, the propulsion unit can be mounted through airtight mounting points onto the internal frame. In common cases where the airship has a frameless envelope, the propulsion unit can be mounted on the surface of the envelope, for example by high-strength hook-and-loop sleeves, for example made from high-strength Velcro®, that are attached airtightly onto the envelope of the airship and wrapped around the mounting frame members.

The invention further provides a method for controlling the flight of an airship having at least one thrust producing propulsion unit comprising an external driveshaft, gimbal mounted to the fuselage of the airship comprising an inner ring and an outer ring having orthogonal rotational axes, and a propeller unit comprising a conical housing pivotable on trunnions with the gimbal and a propeller affixed to a propeller shaft coaxial with the axis of the cone. The method includes the steps of: controlling the altitude and attitude of the airship substantially exclusively by varying the vertical orientation of the propulsion unit and consequently its vertical direction of thrust; and steering the airship substantially exclusively by varying the horizontal orientation of the propulsion unit to rotate the airship about a vertical axis.

DESCRIPTION OF THE DRAWINGS

The principles of the various aspects of the invention may better be understood by reference to the accompanying illustrative drawings which depict features of examples of embodiments of the invention, and in which:

FIG. 1 is a plan view of a single propulsion unit of the invention mounted on an airship;

FIG. 4 is a section on the line IV-IV of FIG. 2.

DETAILED DESCRIPTION OF THE INVENTION

Figure 2:
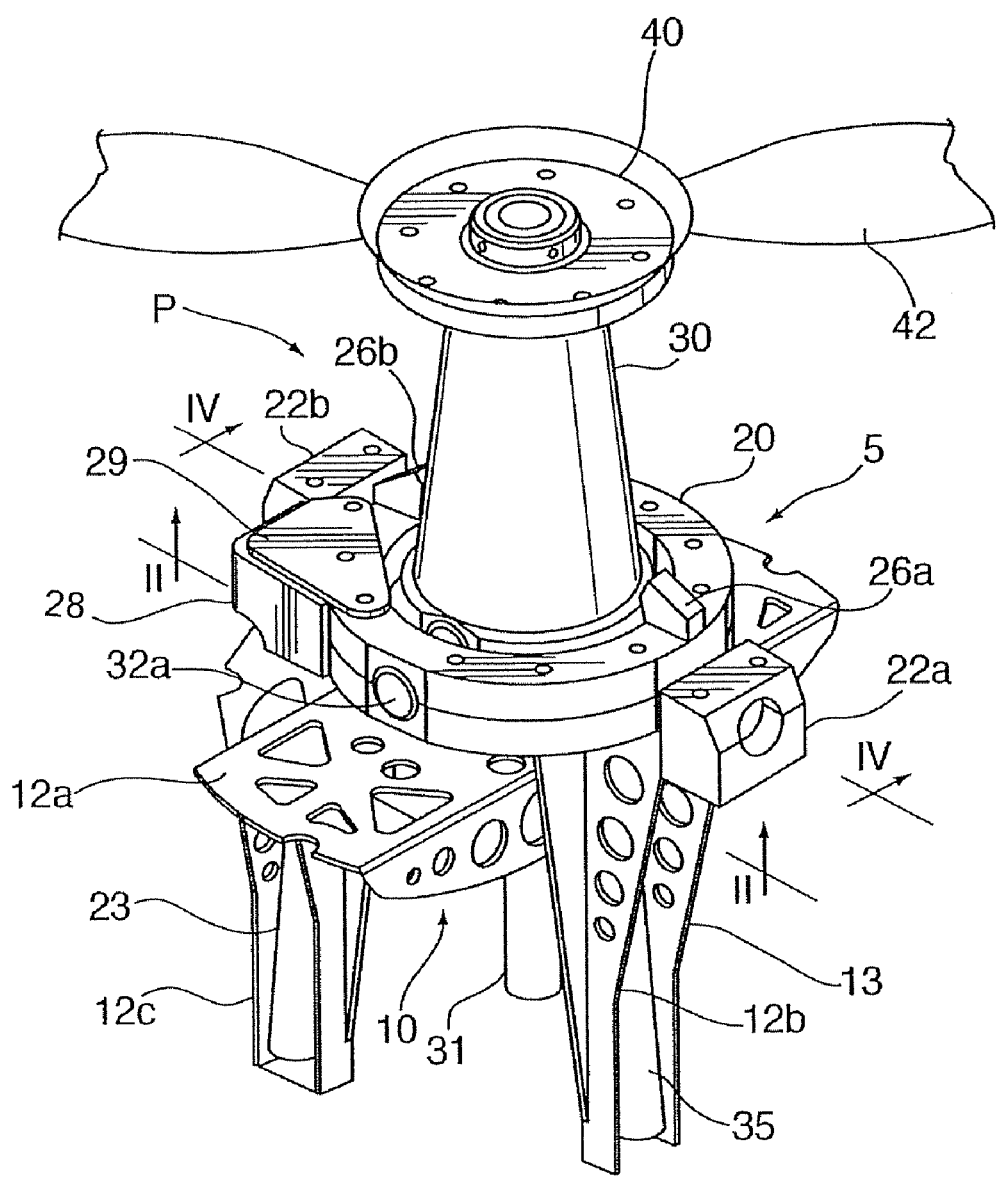
FIG. 2 is an isometric view of a vectored propeller drive used in a propulsion unit of the invention.
Figure 3:
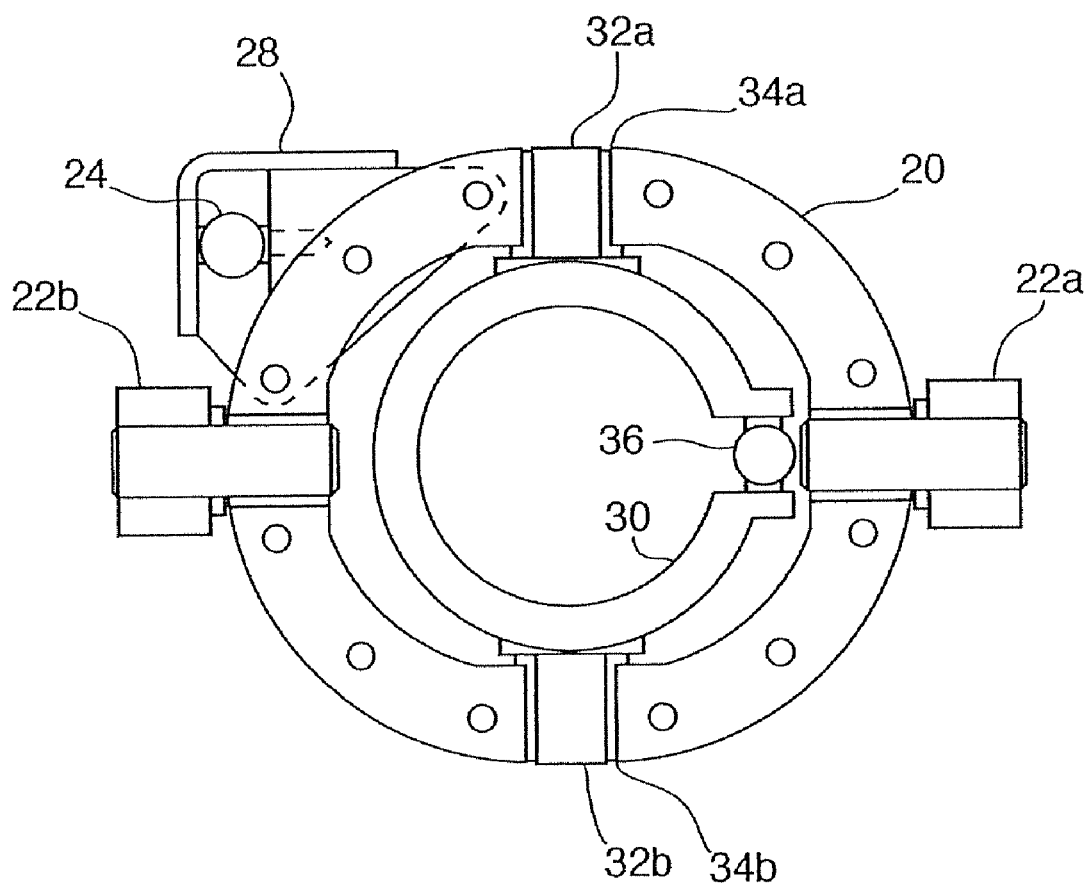
FIG. 3 is a partial cutaway view along the plane II-II of the vectored propeller drive of FIG. 2.

The description that follows and the embodiments described therein are provided by way of illustration of examples of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

Referring to FIG. 1, an airship A includes a buoyant body B with a propulsion unit P mounted at the forward tip of the airship A. The envelope E contains a buoyant gas. The volume of gas within the envelope may be varied to adjust the buoyancy of the airship A in a well known manner that need not be described further. The body B may include an internal or external framework 10 to provide structural support for the propulsion unit P and prime mover M that is mounted to the framework 10 to provide motive power to the propulsion unit P. In a preferred embodiment, the propulsion unit is mounted to the outside of a frameless envelope using high-strength hook-and-loop sleeves, for example made from high-strength Velcro®, that are attached airtightly onto the airship and wrapped around the mounting frame members.

The propulsion unit P provides motive force for the airship A and assists in directional control of the airship as will be described below.

Referring to FIG. 2, the propulsion unit P is mounted on mounting frame 10 which includes a cross bracket 12a on which is mounted a gimbal assembly 5. The gimbal assembly 5 includes a yoke 20 that is mounted on pillow blocks 22a, 22b and forms the outer ring of gimbal assembly 5. Pillow blocks 22a, 22b are affixed to the cross bracket 12a by means of a suitable support, for example a toroidal support. The angular position of yoke 20 with respect to the cross bracket 12a is controlled by an actuator 23 fastened between pivot 24 (see FIG. 2) on the yoke and a mounting bracket 12c depending from the cross bracket 12a.

Conical housing 30 forms the inner ring of gimbal system 5. Conical housing 30 is carried on trunnions 32a and 32b in bearings 34a and 34b in yoke 20. The vertical position of conical housing 30 is controlled by an actuator 35 extending between pin 36 on conical housing 30 and a bracket 13 depending from the yoke 20. Actuators 23 and 35 may be operated by any convenient means, for example hydraulically, and preferably are actuated electro-mechanically.

Travel stops 26a, 26b are mounted on yoke 20 to limit the movement of conical housing 30; in a typical example, the movement of conical housing 30 is about 30 degrees away from a straight line in two axes.

A drive shaft 31 extends from the prime mover M supported on the framework 10 through the gimbal assembly 5 to a propeller mounting flange 40. Propeller mounting flange 40 is carried on conventional bearings within and concentric with the axis of conical housing 30. The flange 40 is connected to the propeller 42 so as to rotate the propeller relative to the conical housing 30 upon rotation of the drive shaft 31.

As illustrated in FIG. 4, the drive shaft 31 includes an inner section 44 connected to the prime mover M and supported in bearings 46 carried by the framework 10, and an outer section 48 connected to the flange 40 and supported in bearings 52 and 54. The inner section 44 and outer section 48 are connected by a constant velocity joint 50 that is centred on the intersection of the axes of rotation of the gimbal assembly 5 so as to accommodate pivotal movement of the propeller 42 relative to the frame 10. The provision of the constant velocity joint and its location in the gimbal provides a relatively simple and therefore lightweight drive to the propeller from the prime mover.

A typical mounting orientation of the propulsion unit P is to have bracket 12b vertically above bracket 13, so that when yoke 20 and conical housing 30 of gimbal system 5 are coplanar, the axis of rotation of the propeller is substantially horizontal. With this orientation, adjustment of the actuator 23 moves the propeller about a horizontal axis and adjustment of the actuator 35 moves the propeller about a vertical axis. Thus lift can be effected by adjustment of the actuator 23 and steering by adjustment of the actuator 35.

In the method of the invention for providing desired thrust and direction of motion, an airship has at least one thrust producing propulsion unit comprising an external driveshaft, gimbal mounted to the fuselage of the airship comprising an inner ring and an outer ring having orthogonal rotational axes, and a propeller unit comprising a conical housing pivotable on trunnions with the gimbal and a propeller affixed to a propeller shaft coaxial with the axis of the cone.

The method includes the steps of: controlling the altitude and attitude of the airship by varying the vertical orientation of the propulsion unit and consequently its vertical direction of thrust; and steering the airship substantially exclusively by varying the horizontal orientation of the propulsion unit to rotate the airship about a vertical axis.

Although shown in FIG. 1 with a single propulsion unit P, an airship A may have two thrust producing propulsion units P disposed one substantially at the point of forward travel and one substantially opposite to the first propulsion unit. In the dual-propulsion unit configuration, the airship can be lowered with little if any horizontal motion by directing the thrust from both propulsion units upwards; thus pushing the airship downwards. A dual-propulsion unit would normally have a tractor-propeller in the front and a pusher-propeller at the rear. The front propulsion unit would in this example point downwards and the rear propulsion unit would point upwards, thereby moving the airship forwards and down. Alternatively, the forward propulsion unit could be set into reverse and pointed upwards, with the rear propulsion unit being pointed downwards. If the direction of thrust of the front and rear propulsion units cannot be made fully vertical, for example if the universal joints do not allow a 90-degree angle between the input and output shafts, then each propulsion unit will continue to provide a small forward or reverse thrust. In such a case, the two propulsion units may be set to provide offsetting forward and reverse thrusts such that the net longitudinal thrust is minimised. To achieve that condition, a tractor front propulsion unit may be directed downward in forward mode and a pusher rear propulsion unit may be directed downward in reverse mode. The forward thrust of the front unit would be offset by the rearward thrust of the rear unit to lower the airship with minimum horizontal motion. Various other alignments of the propulsion unit thrusts may be used if it is necessary to counteract wind forces. On the face of it, the efficiency of such operation might appear to be poor; however, given that the airship has substantially neutral buoyancy, it can be moved vertically with a relatively small amount of thrust. Similarly the airship can be readily rotated in yaw by directing both propulsion units towards the left or towards the right of their straight positions as seen from above, thus providing a clockwise or counter-clockwise moment. Further, the attitude of the airship can be controlled by moving at least one of the two propulsion units vertically, to provide a net moment in pitch. In another embodiment, an elongated airship has in addition a thrust-producing propulsion unit mounted substantially amidships to provide fore-and-aft thrust for normal navigation.

The description above is intended to be illustrative rather than restrictive. Variations in the structure and operation of the vectored propulsion units of the invention may be apparent to the person skilled in the art of airships and their navigation. Such variations on the invention are intended to form part of the invention insofar as they are within the spirit and scope of the appended claims.

What is claimed is:

1. A propulsion unit for an airship, comprising:
   a gimbal assembly having a mounting frame adapted to be mounted on the airship, the gimbal assembly comprising an inner ring and an outer ring, the inner ring being pivotable on a first pivot axis relative to the outer ring, and the outer ring being pivotable relative to the mounting frame on a second pivot axis at substantially right angles to the first axis;
   a driveshaft having an inner section coupled to a prime mover for rotation, and an outer section coaxial with an axis of the gimbal assembly coupled to the inner section by a constant velocity joint at a pivot centre of the gimbal assembly;

a propeller unit mounted to the inner ring on the gimbal, and including a propeller affixed to the second section of the drive shaft;

a first actuator to adjust the orientation of the inner ring relative to the outer ring; and a second actuator to adjust the orientation of the outer ring relative to the mounting frame;

whereby the axis of rotation of the propeller can be controlled about a position coinciding with the axis of the first section of the driveshaft.

2. A propulsion unit as defined in claim 1, wherein orientation of the propeller unit is controlled by a first actuator controlling the inclination of the outer ring relative to the gimbal mount and by a second actuator controlling the inclination of the inner ring relative to the outer ring.

3. A propulsion unit as defined in claim 1, wherein the prime mover is in a fixed position relative to the mounting frame.

4. A propulsion unit as defined in claim 1, wherein the inner ring is carried on the outer ring by a first pair of trunnions, and the outer ring is carried on the mounting frame by a second pair of trunnions.

5. An airship having an envelope and a propulsion unit, said propulsion unit comprising:

a gimbal assembly having a mounting frame adapted to be mounted on the airship, the gimbal assembly comprising an inner ring and an outer ring, the inner ring being pivotable on a first pivot axis relative to the outer ring, and the outer ring being pivotable relative to the mounting frame on a second pivot axis at substantially right angles to the first axis;

a driveshaft having an inner section coupled to a prime mover for rotation, and an outer section coaxial with an axis of the gimbal assembly coupled to the inner section by a constant velocity joint at a pivot centre of the gimbal assembly;

a propeller unit mounted to the inner ring on the gimbal, and including a propeller affixed to the second section of the drive shaft;

a first actuator to adjust the orientation of the inner ring relative to the outer ring; and a second actuator to adjust the orientation of the outer ring relative to the mounting frame;

whereby the axis of rotation of the propeller can be controlled about a position coinciding with the axis of the first section of the driveshaft.

6. An airship as defined in claim 5, wherein the propulsion unit is mounted on the envelope of the airship.

7. An airship as defined in claim 6, wherein the propulsion unit is removably mounted on the envelope by high-strength hook-and-loop fasteners that are airtightly attached to the fuselage and fastened to the mounting frame members.

8. An airship as defined in claim 6, wherein the propulsion unit is removably mounted to a framework attached to the envelope.

9. An airship according to claim 5, wherein a first of said propulsion units is mounted forward on the airship and a second of said propulsion units is mounted aft on the airship.

* * * * *